Figure 1:
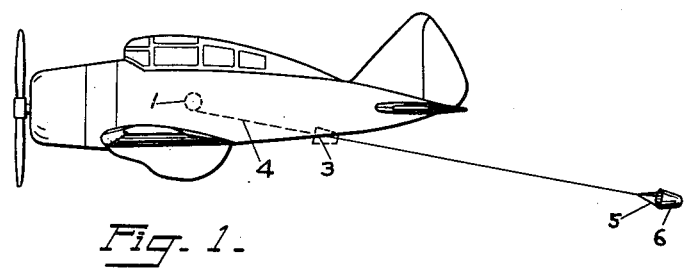

Sept. 20, 1938.  J. L. McCLANE  2,130,504
AIRCRAFT STRUCTURE
Filed Aug. 3, 1937

INVENTOR:
Joseph L. McClane;
BY:
Robert C. Rasche
ATTORNEY.

Patented Sept. 20, 1938

2,130,504

UNITED STATES PATENT OFFICE 2,130,504

AIRCRAFT STRUCTURE

Joseph L. McClane, Hempstead, N. Y., assignor to Seversky Aircraft Corporation, a corporation of Delaware Application August 3, 1937, Serial No. 157,200

3 Claims. (Cl. 244—1)

The present inventive concepts relate to communication systems. More particularly, they relate to aircraft radio antenna of the trailing type.

It is still generally the present practice to provide aircraft radio antennae, where of the trailing type, with a heavy weight or "fish" at their termini (which weight adds undesirably to the weight of the radio installation), and laboriously to manually reel them out and reel them in each time the craft takes off or lands or changes its position from another craft flying in formation with it. In formation flying, the airspeed of the craft and the distance from other crafts, is continually varied, and hence the pilot is required to continually vary his antenna length and to estimate by eye the distance between his craft and following craft above and beneath him in order to reel out the proper length of antenna for the desired volume of reception and transmission while precluding its becoming entangled with the propeller or other parts of the other planes beforementioned. All this tends to distract the pilot's attention from his other operations and adds to his already multifarious duties while flying.

It is the chief object of the invention to provide a trailing type antenna for aircraft which will not require a "fish" and which will not make manual operation mandatory in order to vary its extension or require estimation by eye of the proper distance to trail it aft, and which instead will be automatically extended and retrieved without requiring any attention at all by the pilot, thereby permitting him to devote his undivided attention to the many other operations he has to perform.

It is also an object of the invention to provide a trailing-type antenna which cannot drag down on the fin or rudder, or become fouled with the other controls in the empennage, or with following craft, either above or below it.

The invention also aims to obviate the possibility of accidents, due to the pilot of a craft having a trailing antenna landing with his antenna extended and with the "fish" dragging along the ground with danger of its engaging some obstacle and thereby causing an outside ground loop, or at least destroying most of the rather delicate radio installation.

A particular object of the invention is to provide a trailing antenna which will have this improved nature but which will be nonetheless rugged and durable, easy to install, inexpensive to manufacture, and adapted to quantity production.

The other concepts, objects and advantages of the invention will manifest themselves as this disclosure progresses and with these and other aims in mind, the invention includes the features, combinations, subcombinations, and elements disclosed in the specifications following, shown in accompanying drawing, and included within the scope of the subjoined claims.

Figure 2:
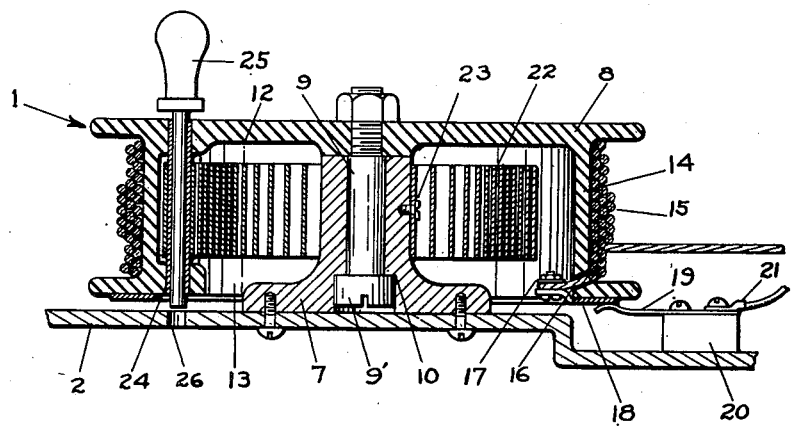

In the drawing,

Fig. 1 is a side elevation of a high-speed military airplane in flight in formation, and employing the antenna system of the present invention, and Fig. 2 is a detailed cross-sectional view of a component of the antenna system.

The antenna system of the present invention is based, among other things, on the concept of providing smallish, high-speed, military airplanes, normally operated in military formations, with somewhat inefficient, but areodynamically quite efficient, trailing type antenna yet which will involve the least number of parts, will occupy the minimum space in the small craft when not in use, and will entail no danger of fouling the rear controls or empennage of the craft in which it is mounted when in use or of fouling the propeller, undercarriage, or other part of those planes which are flying in formation above or below it, even when fully extended.

To this end, the antenna system comprises, in the form shown in the accompanying drawing, an antenna support or base, here shown as a reel 1, mounted on a bracket 2 inside the single cockpit of a single-seat pursuit airplane, of the type recently produced by the Seversky Aircraft Corporation, closely adjacent the pilot's lefthand. A large self-closing aperture 3 is provided between bulkheads in the underside of the fuselage below, and forward of, the empennage. The reel 1 bears a length of electrically conductive material 4, one end of which is detachably attached to the reel, and the other end of which bears a three-member harness 5. To this harness is attached an aerodynamic drag-member 6, here shown as approximating a wind sock. The reel 1 being on the inside of the fuselage, convenient to the pilot's left hand and above the line of trail of the antenna, the force of gravity and aerodynamic forces as well, tend to assist the pilot in reeling out the wire manually when he chooses to so extend it, as for testing, calibrating, etc. The aperture 3, being located on the underside of the fuselage, aft of the protruding portions of the landing gear and considerably below the empennage, there is no possibility of the antenna fouling the landing gear or the empennage, the upper rear edge of the aperture 3 tending to restrain upward movements, bodily, of the antenna and sock to such an extent as to render contact between the antenna and the controls surfaces in the empennage practically impossible. By means of the downwash from the wings, in combination with the location of the restraining after-edge of the opening 3, the line-of-trail of the antenna 4 and sock, when extended, will be maintained substantially along the desired optimum line-of-trail shown by the full line in Fig. 1. Hence, there is no possibility of the antenna and sock becoming entangled, with obvious consequences, with the propeller, etc. of other aircraft flying in the formation, but above it and to the rear of it. By the same token, there is little likelihood of the antenna fouling the propeller, etc. of planes fluing in the formation but below and to the rear of it.

When the antenna system is not in use, it is housed in the fuselage with a portion of the front periphery of the sock protruding from aperture 3. It is adapted to be hauled in, and payed out, either manually or automatically, by employment of the means shown in Fig. 2. By virtue of these means, the antenna-system can automatically be caused to trail aft of the aircraft when flying at, or above, a predetermined velocity, and to be retrieved automatically when the airplane is flying below a predetermined velocity. As contemplated by the present invention, these means comprise a torsion member, such as a spring attached to the inside of the airplane, near the pilot's seat, and directly or indirectly attached to the inner end of the antenna wire, and a cone-shaped wind-sock attached to the free trailing end of the antenna wire. When the pilot wishes automatic operation, the spring-held inner end of the wire is released from torsion, and the air pressure on the forward periphery of the sock is sufficient to overcome the restraining force of the spring, or equivalent, thereby extending the wire and sock aft of the plane. The antenna will be automatically retrieved when the velocity of the plane decreases to such a figure that the torsional force of the spring overcomes the air-pressure on the sock.

The invention also contemplates auxiliary means by which the antenna may be extended or retrieved at will, regardless of the velocity of the aircraft, as by means of a manually operated crank or the like, suitably connected into the system. The use of a sock, instead of the usual "fish" (lead weight) entails an appreciable percentage of weight saving in the small planes for which the present system is particularly intended, and the automatic retrieving feature permits the single pilot to attend to the many other manipulations he has to make preparatory to, and during, landing, and also obviates all possibility of a pilot landing with his antenna still trailing aft on the ground to catch on projections, etc., which would at least ruin the radio equipment, if not causing serious damage to the plane itself.

A form of combined automatic and manual reeling-means for use in accomplishing these objects is shown, by way of exemplification only, in Fig. 2. In this figure is shown a bracket 2 attached to the inside of the fuselage having a hollow, shouldered boss 7, detachably attached thereto, as by machine screws; a hollow flanged drum 8 rotatably mounted on the boss by means of a bolt 9 having its threaded upper end protruding thru the boss and its headed end 9, seated against a shoulder 10 in the boss, and a nut 11 serving to maintain the drum in place. The drum has a closed face 12, an open face 13, and a hub 14. On the hub are shown a plurality of coils of electrically conductive material 15, one end of which material is detachably attached to the interior periphery of the drum thru an aperture 16, by means of a suitable wire clamp 17. The lower face of the drum bears an annulus 18 of electrically conductive material, and the bracket 2 bears a spring-contact 19, mounted on an insulating block 20. One end of the radio-set lead-in wire is shown at 21.

A flat spring 22, coiled lengthwise, surrounds the boss, parallel to same, and is attached thereto by one end 23, as by means of a machine screw. The other end of the spring is bent around a bushing 24 mounted transversely of the drum.

For purposes of locking the drag-member in the housing, a handle 25 is passed thru the bushing 20 in alignment with an aperture 26 in the bracket. Upon penetration of the aperture by the member 25, the reel is locked, but upon withdrawing it therefrom, the handle may be employed to manually pay out, or haul in, the antenna, when desired.

It is to be understood that the showing and description hereinabove is given by way of example only, the invention being limited in its embodiments only by the scope of the subjoined claims.

Having now disclosed my invention, and one mode of realizing it, in such manner as to enable those skilled in the art to make and use it, what I claim as my invention, and desire to secure by Letters Patent of the United States, is:

1. In an aircraft, a bracket unitary with the interior periphery of the fuselage, a hollow boss detachably attached thereto and extending substantially horizontally into the cockpit, a bolt seated in said hollow by its head and having its threaded end protruding beyond the uppermost end of said boss, a hollow, flanged electrically non-conductive drum having an open face and a closed face, the closed face having an aperture for receiving the threaded end of the bolt therethrough, a nut on said threads engaging said closed face and urging the drum against said boss, a flat spring coiled lengthwise in said hollow drum and attached by one end to said boss, a bushing extending transversely through said drum near the periphery thereof, the other end of said spring being bent therearound, and a length of electrically-conductive material wound around said drum and having one end attached at a point on the inner periphery of said drum.

2. In an aircraft, a bracket attached to the interior of the fuselage, a hollow boss detachably attached thereto and extending substantially horizontally into the craft, a bolt seated therein and having its threaded end protruding beyond the upper end of said boss, an electrically non-conductive drum having an open face and a closed face, the closed face having an aperture for receiving the bolt therethrough, a nut on said bolt urging the drum against the boss, a spring in said drum and attached to said boss, a bushing extending transversely through the drum, said spring having an end bent therearound, a length of electrically-conductive material wound around said drum and having one end attached at a point on the inner periphery of said drum, an annulus of electrically-conductive material attached to the periphery of the open face of the drum, a spring-contact electrical terminal attached to said bracket, and lead-in wires for a radio set attached to one end of said terminal.

3. In an airplane radio system, a linear antenna supported by one end in the craft for extension aft, the location of the support being considerably above the other end of the antenna whereby both gravitational and aerodynamic forces are rendered capable of aiding in extending the antenna, the airplane having a fuselage having an enlarged, self-closing aperture in its underside for the passage of the antenna, a drag-member attached to the other end of said antenna, said drag-member being housable in the underside of the fuselage through said aperture at a location in the fuselage considerably below the point of support of said antenna with portions of its front and upper sides so housed as to expose only that portion of the housed drag-member which is incapable of causing the drag-member to be pulled out of said housing at normal ground-operating speeds to thereby prevent extension of the antenna to any degree while the craft is on the ground as in taxying, taking-off or landing, that portion of the said drag-member being exposed by said housing arrangement which is capable of causing the relative wind to pull said drag-member out of said housing when the craft is in the air and the relative wind is appreciably greater than ground-operating speeds, the upper, aft edge of said aperture being located with a relationship to the wings such as to cooperate on the antenna system with the downwash from the wings to thereby maintain the line-of-trail of the antenna considerably below the lowest portion of the empennage, and means at the supported end of said antenna for automatically permitting the relative wind to vary the length of extension of the antenna to the exact lengths suitable for radio transmission and reception at all air speeds without estimation thereof by the pilot, and for automatically retrieving and housing said drag-member against the relative-wind into the aforementioned attitude in said opening in the underside of the fuselage upon the speed of the craft approaching ground-operating speeds.

JOSEPH L. McCLANE.